United States Patent [19]

Chou et al.

[11] Patent Number: 4,908,136
[45] Date of Patent: Mar. 13, 1990

[54] METHOD AND APPARATUS FOR FORMING AND ION-EXCHANGING A FILTER CAKE

[75] Inventors: Tai-sheng Chou, Pennington, N.J.; Thomas R. Kiliany, Jr., West Chester, Pa.

[73] Assignee: Mobil Oil Corp., New York, N.Y.

[21] Appl. No.: 339,571

[22] Filed: Apr. 18, 1989

Related U.S. Application Data

[63] Continuation-in-part of Ser. No. 139,546, Dec. 30, 1987.

[51] Int. Cl.[4] ............................ B01D 33/32; C02F 1/42
[52] U.S. Cl. ..................................... 210/661; 210/248; 210/273; 210/400; 210/406; 210/679; 210/681; 239/193
[58] Field of Search ............... 210/410, 248, 270, 271, 210/273, 400, 406, 456, 661, 679, 681; 422/139, 220; 423/112, 332; 239/193; 73/215; 137/101.27

[56] References Cited

U.S. PATENT DOCUMENTS

| | | | |
|---|---|---|---|
| 1,017,083 | 2/1912 | Cuppel | 210/456 |
| 3,524,731 | 8/1970 | Effron et al. | 422/220 |
| 3,685,971 | 8/1972 | Carson | 422/220 |
| 3,943,233 | 3/1976 | Swanson et al. | 210/401 |
| 4,048,284 | 9/1977 | Horton et al. | 423/332 |
| 4,483,770 | 11/1984 | Casey et al. | 210/401 |
| 4,495,070 | 1/1985 | Pierson | 210/406 |
| 4,673,507 | 6/1987 | Brown | 210/681 |

Primary Examiner—Richard V. Fisher
Assistant Examiner—Joseph Drodge
Attorney, Agent, or Firm—Alexander J. McKillop; Charles J. Speciale; Dennis P. Santini

[57] ABSTRACT

Disclosed is an improved method and apparatus for creating a more uniform filter cake on a vacuum filter belt. A weir box for depositing a slurry on the filter belt has an outlet in the form of a plurality of slots spaced transversely of the filter belt with each slot being in the form of a truncated triangle with the base of the triangle being located closer to the filter belt than the truncated portion of the triangle.

12 Claims, 1 Drawing Sheet

METHOD AND APPARATUS FOR FORMING AND ION-EXCHANGING A FILTER CAKE

CROSS-REFERENCE TO RELATED APPLICATIONS

This is a continuation-in-part of application Ser. No. 139,546, filed Dec. 30, 1987.

BACKGROUND OF THE INVENTION

1. Field of the Invention

The present invention is broadly directed to the field of forming a uniform material layer on a moving belt and, more particularly, to the field of forming and ion-exchanging a uniform layer of mineral, ore or catalyst filter cake.

2. Discussion of the Prior Art

It is well known that various types of solid materials can be effectively processed by creating a material layer on a moving vacuum filter belt and then treating the material layer as it passes along on the filter belt. This technique is very common in the processing of minerals and is also well known in the field of producing catalysts. As an example, a phosphate ore is processed by depositing a slurry containing the phosphate-containing ore on a vacuum belt, to form a filter cake, and then ion-exchanging the filter cake by flowing an ion-exchanging liquid over and through the moving filter cake as it is carried along by the filter belt. The ion-exchange step reduces undesirable ions which are carried by the filter cake.

The basic process of ion-exchange of a catalyst filter cake to enhance its hydrocarbon conversion effectiveness by reducing ionic poisons is described, for example, in U.S. Pat. Nos. 4,048,284 and 3,943,233. These patents disclose the formation of a catalyst filter cake on a horizontal vacuum filter belt by depositing a slurry of catalyst particles on the filter belt which form the filter cake and then subjecting the catalyst filter cake to an ion-exchange process with an ion-exchange solution to produce a filter cake which can be further processed into a hydrocarbon cracking catalyst.

The liquid slurry containing the mineral, ore or catalyst in finely divided solid form is layered on the moving vacuum filter belt to a thickness of ¼ to 2" by means of a weir box positioned above the moving filter belt. The ion exchanging liquid which flows onto the thin filter cake is deposited by another weir box in order to avoid breaking up or forming crevices on the surface of the body of the filter cake. One or a plurality of ion-exchange stages are typically used, each having one or more weir boxes positioned above the horizontal filter belt carrying the filter cake. After ion-exchange, the filter cake is then typically washed by flowing a water or other washing substance over and through the ion-exchanged filter cake by means of another weir box positioned above the horizontal filter belt, after which the filter cake is recovered and processed further.

In order to maximize the ion exchange conditions existing between the filter cake and ion exchanging liquid, an efficient contact between the exchange liquid and filter cake transported on the filter belt is required, which requires a filter cake of uniform thickness. Any break-through of the exchange liquid because of a non-uniform distribution of the thickness of the filter cake causes a higher than normal retention of replaced ion. This causes difficulty since the undesirable ions are retained by the filter cake.

The outlet of a conventional slurry weir box has the saw tooth profile illustrated in FIG. 2. It has been found that this type of weir box outlet construction does not always produce a uniform filter cake thickness. It is believed that this is due to surges in, or uneven liquid level of, the slurry in the weir box.

Because of the non-uniformity produced in the thickness of the filter cake, changes in the ionic content of a wet filter cake can be observed when all other process variables are seemingly held constant. The variability of the ionic content is accordingly attributed to transient non-uniform distribution of a slurry of, for example, minerals, ore or catalyst on the filter belt.

SUMMARY OF THE INVENTION

The present invention has been designed to provide a more uniform layering of a solid material slurry, such as mineral, ore or catalyst, e.g. zeolite, slurry, onto a filter belt to form a filter cake, thereby improving the overall efficiency of downstream mass transfer processing, such as ion-exchange, carried out on the filter cake.

In order to achieve a more uniform distribution of the filter cake on the belt, the present invention employs a slurry weir box which has a unique outlet construction whereby a plurality of cutouts spaced along the weir box outlet are each in the form of a truncated triangle, with the base of the triangle being located closer to the filter belt than the truncated portion of the triangle. As a consequence, slurry within the weir box passing through the truncated cone cutouts is more uniformly distributed on the filter belt even in the presence of slurry surges and an uneven slurry level in the weir box, thereby reducing non-uniformities in the thickness of the filter cake.

Accordingly, one object of the invention is to provide a more uniform layer of a filter cake on a moving filter belt.

Another object of the invention is to provide a more uniform layer of a mineral, ore or catalyst filter cake on a moving filter belt to improve, for example, an ion exchange transfer in which an ion exchanging liquid is contacted with the filter cake.

Another object of the invention is to provide a more uniform layer of a mineral, ore or catalyst composition filter cake on a moving filter belt with minimum changes to existing equipment, thereby reducing the overall cost of improving the ion-exchange processing of such a filter cake.

The above and other objects, advantages and features of the invention will be more readily understood from the following detailed description of the invention which is provided in connection with the accompanying drawing wherein FIG. 1 illustrates the overall apparatus which implements an embodiment of the present invention;

FIG. 2 illustrates the prior art slurry weir box outlet design upon which the present invention improves; and FIG. 3 illustrates the improved slurry weir box outlet design of the invention.

DETAILED DESCRIPTION OF THE INVENTION

It should be appreciated that the present invention is applicable to the production of a uniform layer of any type of filter cake on a vacuum filter belt.

Figure 1:
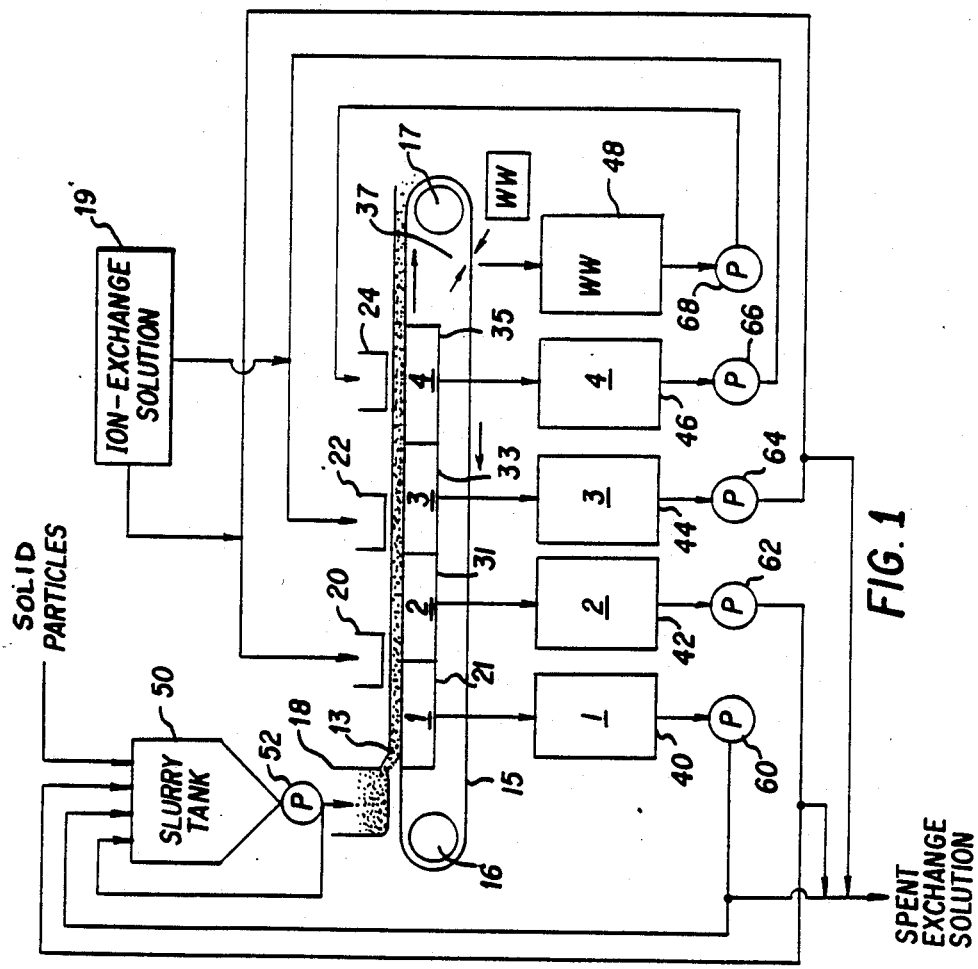

FIG. 1 depicts in side view the apparatus used in carrying out the invention.

A horizontal vacuum belt 15 is provided in the form of an endless belt which travels around rollers 16 and 17. Disposed above the filter belt 15 are a plurality of liquid distribution weir boxes 18, 20, 22 and 24. Each of the weir boxes defines a respective processing stage (1, 2, 3, 4) along filter belt 15. Although four such processing stages are illustrated in FIG. 1, it should be apparent that a smaller or larger number of processing stages may be used depending on the material being layered on the filter belt 15, and the processing to be performed thereon. Filter belt 15 is a conventional vacuum filter belt, well known in the art, and includes vacuum box sections 21, 31, 33 and 35 located beneath the belt at respective processing stages 1, 2, 3, 4. The vacuum boxes 21, 31, 33 and 35, which receive slurrry and/or liquid passing through filter belt 15, are connected to respective receiving tanks 40, 42, 44 and 46.

Figure 3:
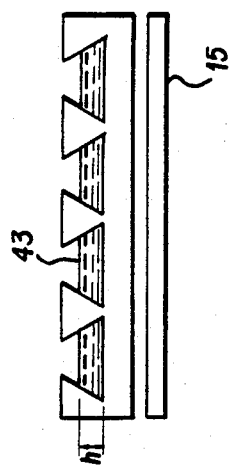

As a non-limiting example, in the first processing stage (1) a mineral, ore or catalyst composition slurry is provided from slurry tank 50 through a pump 52 to weir box 18. The weir box 18 has a slurry outlet in the form shown in FIG. 3. The outlet extends transversly of the filter belt 15, as illustrated in FIG. 3, and includes a plurality of cutouts 43 each in the form of a truncated triangle, with the base of the triangle being located closer to the surface of the filter belt 15 than the truncated portion of the triangle. The cutouts 43 are uniformly spaced across the transverse direction of the filter belt 15 and a catalyst slurry provided in the weir box 18 flows onto the filter belt 15 through the cutouts 43.

Figure 2:
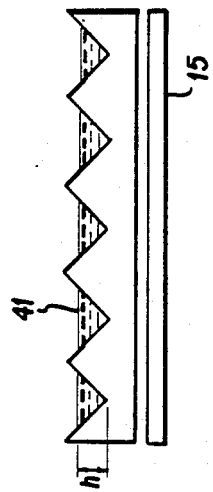

Because the cutouts 43 are in the shape of a truncated triangle, they provide a more uniform distributed output of slurry material even with disturbances in the slurry flow within the weir box 18. If, for example, the slurry level is uneven, a uniform distribution of slurry onto filter belt 15 will occur because the flow through the slots 43 is proportional to the height of the head of the slurry above the slot base raised to a power less than 1 (i.e. flow $\propto h^x$, where x is $\leq 1$). Typically, x will have a value of approximately 0.5. By contrast, the flow through a triangular slot such as illustrated in FIG. 2, is proportional to the head squared (i.e. flow $\propto h^2$). Accordingly, any disturbances in slurry, or an uneven slurry level will have less of an effect on the distribution of slurry onto filter belt 15 than is true of the FIG. 2 outlet design.

The first processing stage (1) also includes receiving tank 40 which receives any slurry solution passing through the filter belt 15 and into vacuum box 21, and a pump 60 for recycling slurry in tank 40 back to the slurry tank 50. A portion of the slurry exiting pump 52 is also recycled back to slurry tank 50.

After the filter cake 13 is formed on the filter belt 15 in the first vacuum stage (1) (defined by vacuum box 21), the filter cake 13 passes into stage 2 and beneath a second weir box 20 which distributes, for example, an ion-exchange liquid onto and through the filter cake 13. In this ion-exchange stage, the ion-exchange liquid is a mixture of an ion-exchange liquid from a source 19 and a recycled ion-exchange liquid from the next stage (3) recycled through vacuum box 33, receiving tank 44 and pump 64. For some catalyst compositions where the ion to be removed is $Na^+$, the ion exchange liquid is high in ammonium ($NH_4^+$) ions, which exchange with the $Na^+$ ions within the catalyst composition. An ammonium salt solution, e.g. ammonium nitrate, may be used as the exchange liquid. The ion-exchange liquid flows from the weir box 20 onto the filter cake and percolates through the cake producing the desired ion exchange. This ion exchange may take place in one ion exchange stage defined by weir box 20 and associated vacuum box 31. More than one ion-exchange stage can be also employed and this is illustrated by weir box 22 in FIG. 1. Ion-exchange stage 2 has its vacuum box 31 connected to a receiving tank 42 which receives the exchanged liquid. The exchanged liquid is pumped by pump 62 to the slurry tank 50. The third stage 3 is, as noted, another ion-exchange stage. In this stage, the ion-exchanging liquid is formed, in part, from ion-exchange liquid from source 19 and, in part, from wash water taken from stage 4 and circulated through vacuum box 35, receiving tank 46 and pump 66. If desired, more than two ion-exchanging stages may be used with each upstream stage receiving ion-exchanging liquid from source 19 and from the receiving tank of the next-in-line downstream processing stage.

After the ion-exchanging stages, the filter cake 13 then passes into a washing stage (4) wherein a weir box 24 distributes a washing solution onto and through the filter cake. The wash solution may be simple wash water. As shown in FIG. 1, this wash water is taken from a wash water tank 48 through pump 68. Tank 48 receives wash water which is used to clean filter belt 15 on its return run. In each of the stages 1 through 4 the level of liquid on and in the filter cake is controlled by the amount of vacuum applied by the vacuum equipment, as described in detail in U.S. Pat. No. 3,943,233. The point where filter belt 15 wraps around the right most roller 17 is where the filter cake is recovered and further processed. The filter belt 15 is washed on its return run to remove residual particles by wash station 37 supplying a washing fluid to the belt 15.

The present invention provides a greater ion-exchange efficiency by providing better, more uniform ion-exchanging conditions due to the more uniform layering of the mineral, ore or catalyst composition slurry on the filter belt 15 to form the filter cake 13.

In addition, a more uniform distribution of ion-exchanging liquid onto and through the filter cake can be achieved by constructing the outlets of weir boxes 20, 22 and 24 in the manner shown in FIG. 3.

It should be understood that the present invention can be used to uniformly layer any type of slurry material onto a moving vacuum belt. Accordingly, the invention is not to be construed as being limited by the foregoing description, but is only limited by the scope of the claims appended hereto.

We claim:

1. An apparatus for producing a filter cake comprising:
   a moving horizontal vacuum filter belt having at least one vacuum stage associated therewith;
   a first weir box positioned over said filter belt for depositing a slurry containing a mixture of solid particles onto said filter belt to produce a solid particle filter cake on said filter belt, said first weir box including a slurry outlet extending transversely of said filter belt through which said slurry passes as it is deposited on said filter belt, said slurry outlet including a plurality of cutouts spaced there along, each of which has the shape of a truncated triangle with the base of the triangle being closer to the filter belt than the truncated portion of the triangle; and means for providing a sufficient amount of slurry to said first weir box so that slurry passes onto said filter belt by flowing through said cutouts.

2. An apparatus as in claim 1, wherein said slurry mixture comprises solid mineral, ore or catalyst particles.

3. An apparatus as in claim 2, wherein said solid particles comprise catalyst particles.

4. An apparatus as in claim 1, further comprising means for producing an ion-exchange in said filter cake which comprises: at least a second weir box disposed above said horizontal vacuum filter belt downstream of said first weir box, said second weir box including an outlet extending transversely of said filter belt for flowing an ion-exchanging liquid over and through said filter cake, and means for supplying an ion-exchanging liquid to said second weir box.

5. An apparatus as in claim 4, wherein said slurry comprises mineral, ore or catalyst particles and said filter cake contains excess undesirable ions, and said ion-exchange liquid contains ions which exchange with undesirable ions in said filter cake.

6. An apparatus as in claim 4, wherein the outlet of said second weir box includes a plurality of cutouts spaced there along, each of which has a shape of a truncated triangle with the base of the triangle being closer to the filter belt than the truncated portion of the triangle.

7. A process for producing a filter cake comprising:
moving a horizontal vacuum filter belt having at least one vacuum stage associated therewith;
depositing a slurry containing a mixture of solid particles onto said filter belt through a first weir box to produce a solid particle filter cake on said filter belt, said first weir box including a slurry outlet extending transversely of said filter belt through which said slurry passes as it is deposited on said filter belt, said slurry outlet includinng a plurality of cutouts spaced there along, each of which has the shape of a truncated triangle with the base of the triangle being closer to the filter belt than the truncated portion of the triangle; and providing a sufficient amount of slurry to said first weir box so that slurry passes onto said filter belt by flowing through said cutouts.

8. A process as in claim 7, wherein said slurry mixture comprises solid mineral, ore or catalyst particles.

9. A process as in claim 8, wherein said solid particles comprise catalyst particles.

10. A process as in claim 7, further comprising the steps of ion-exchanging said filter cake by passing an ion-exchange liquid through said filter cake by means of at least a second weir box disposed above said horizontal vacuum filter belt downstream of said first weir box, said second weir box including an outlet extending transversely of said filter belt for flowing an ion-exchanging liquid over and through said filter cake, and supplying an ion-exchanging liquid to said second weir box.

11. A process as in claim 10, wherein said filter cake contains excess undesirable ions and said ion-exchange liquid contains ions which exchange with undesirable ions in said filter cake.

12. A process as in claim 10, wherein the outlet of said second weir box includes a plurality of cutous spaced there along, each of which has a shape of a truncated triangle with the base of the triangle being closer to the filter belt than the truncated portion of the triangle.

* * * * *